United States Patent [19]

Head, Sr.

[11] Patent Number: 5,540,538
[45] Date of Patent: Jul. 30, 1996

[54] SNOWMOBILE TRAILER SYSTEM

[76] Inventor: Ronald R. Head, Sr., HC 89 - Box 21, Pocono Summit, Pa. 18346

[21] Appl. No.: 398,912

[22] Filed: Mar. 6, 1995

[51] Int. Cl.⁶ ...................................................... B60P 1/28
[52] U.S. Cl. ............................... 414/485; 280/400; 298/5; 298/9; 414/483
[58] Field of Search ..................... 414/480, 481, 414/482, 483, 485, 484; 298/5, 9; 280/400, 402, 423.1, 47.131, 63, 18.6; 254/3 R, 3 B, 3 C

[56] References Cited

U.S. PATENT DOCUMENTS

| | | |
|---|---|---|
| 76,856 | 4/1968 | Warren et al. . |
| 3,342,508 | 9/1967 | Thomas . |
| 3,604,579 | 9/1971 | Jenkins ................................ 414/482 |
| 3,757,972 | 9/1973 | Martin . |
| 3,807,593 | 4/1974 | Bourton ........................... 280/400 X |
| 3,945,521 | 3/1976 | Decker . |
| 4,222,698 | 9/1980 | Boelter ............................. 414/485 X |
| 5,016,896 | 5/1991 | Shafer .................................. 280/400 |
| 5,259,720 | 11/1993 | Lobner ............................. 414/485 X |

FOREIGN PATENT DOCUMENTS 37034  3/1982  Japan ..................... 414/485

*Primary Examiner*—Frank E. Werner
*Attorney, Agent, or Firm*—Sanford J. Piltch

[57] ABSTRACT

A trailer for carrying power driven equipment which can be driven onto or off from either side or the rear thereof is disclosed. The trailer comprises a drawbar having a trailer hitch for coupling to a vehicle that tows the trailer, a second coupling device for allowing the trailer bed of the trailer to be disconnected from the drawbar, and a universal joint that not only allows for the tilting up and down of the trailer bed, but also rotational motion of the trailer bed, thereby allowing the trailer bed to be arranged to accommodate side loading/unloading of the equipment.

6 Claims, 3 Drawing Sheets

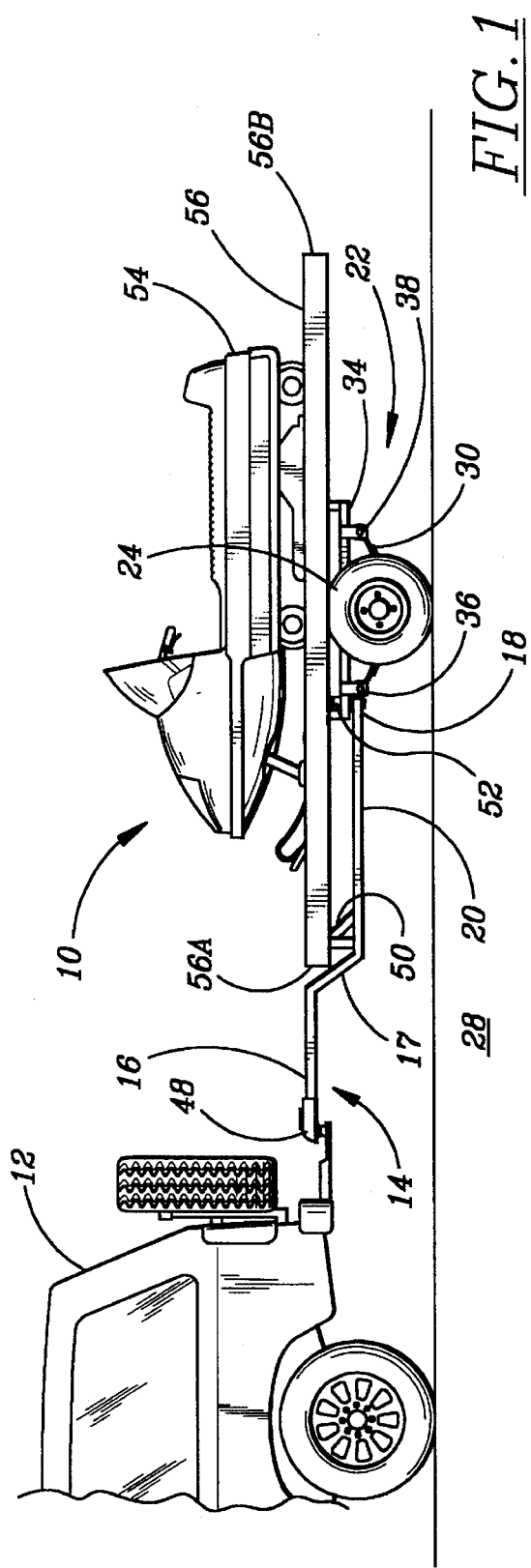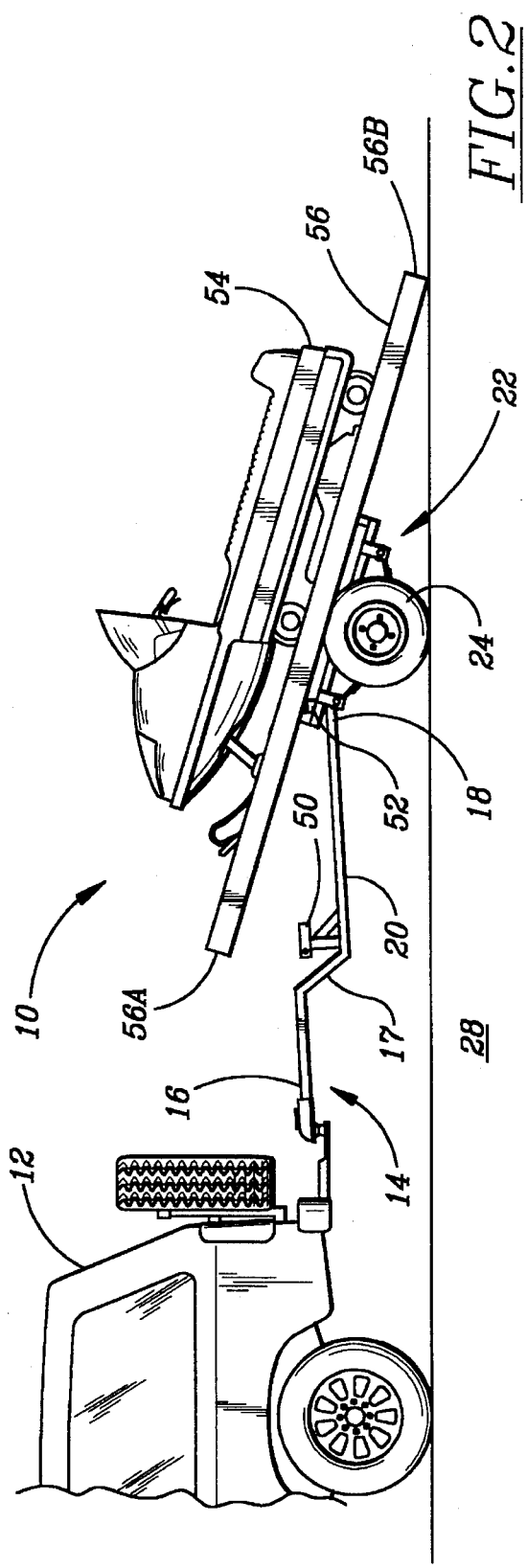

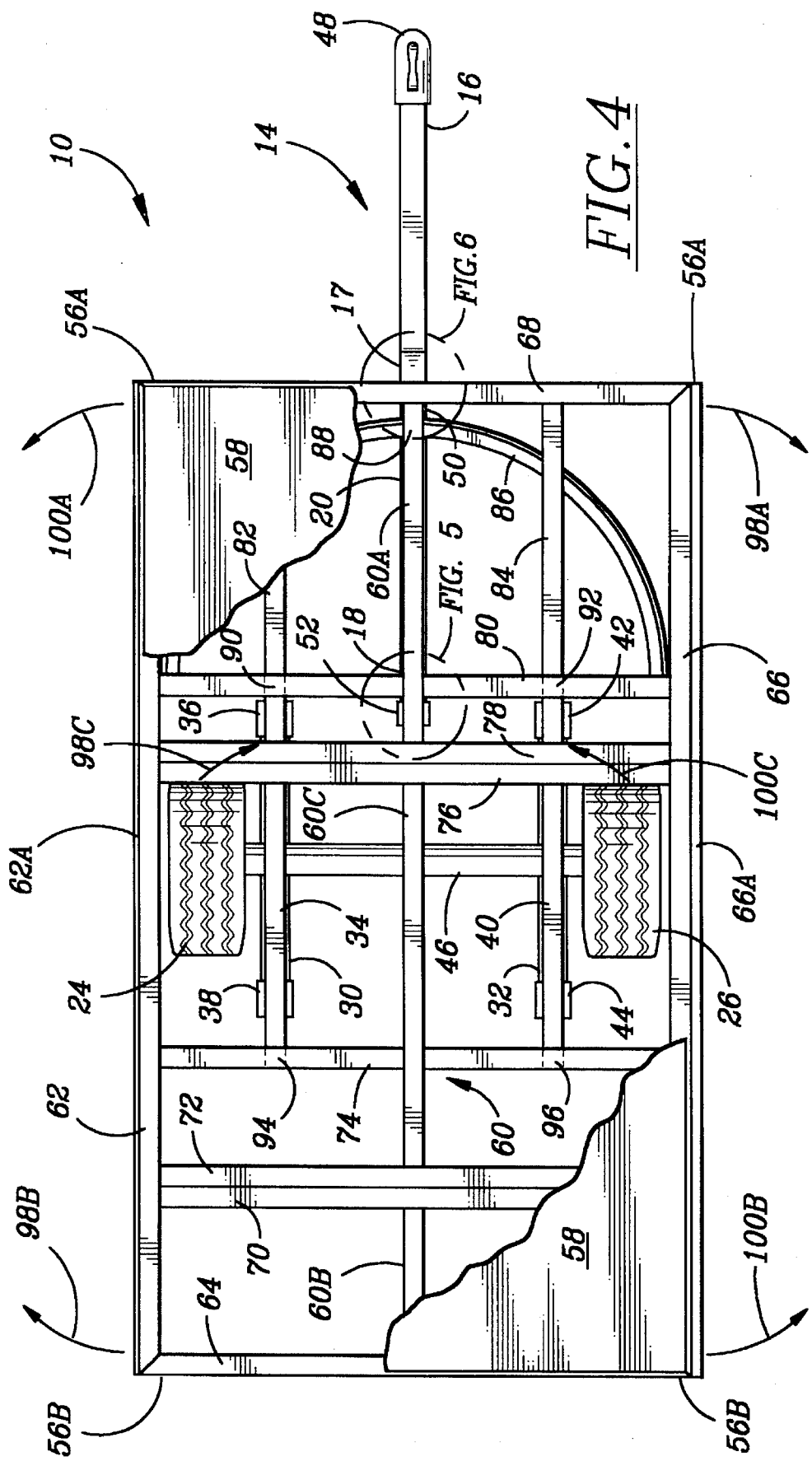

SNOWMOBILE TRAILER SYSTEM

FIELD OF THE INVENTION

The present invention relates to specialized trailer means adapted to be towed by a vehicle and, more particularly, to trailer means carrying power driven equipment, such as a snowmobile, that can be driven onto or driven off from either side of the trailer means.

BACKGROUND OF THE INVENTION

Trailers and other wheeled devices used for hauling equipment are well known and some of which are disclosed in U.S. Pat. Nos. 76,856 [Dray], 3,342,508 [Thomas], 3,757,972 [Martin], and 3,945,521 [Decker]; all of which are incorporated herein by reference.

The Decker patent discloses a towing trailer that is particularly suited for the hauling, loading and unloading of power driven equipment, such as snowmobiles or lawn tractors. The trailer of the Decker patent comprises a turntable that allows the trailer bed, on which the power driven equipment rests, to be rotated 180° so that the power driven equipment originally driven onto the trailer bed and facing the towing vehicle is now facing away from the towing vehicle, thereby, allowing the power driven equipment to be driven off of the trailer in a forward direction. Although the trailer of the Decker patent serves well its intended purpose and allows the power driven equipment, such as a snowmobile, to be driven onto and off of the trailer bed in a forward direction, the trailer does not have any provisions for allowing the snowmobile to be driven onto or off of the trailer bed from either side thereof which presents certain drawbacks. For example, frequently, because of the operation of road scrapers, snow is piled along the side of a road to substantial heights.

Presently, most trailers which are able to accommodate snowmobiles (or other powered trailers) do not permit (as does Decker) the forward motion of the snowmobile. An operator must back the vehicle off the trailer, sometimes requiring a great deal of effort to push the vehicle in the reverse direction.

Further, it is extremely difficult to lift a snowmobile over a steep snow bank caused by road scrapers or plows, and it is certainly impractical to position the trailer and its towing vehicle transversely across a road, so that the trailer bed of the Decker patent may be arranged and rotated 180° to allow the snowmobile to be driven therefrom in a forward direction and thus bypass the lifting thereof over the snow bank. It is, however, desirable for the trailer and the towing vehicle to be arranged in parallel orientation to the roadside and allow the trailer bed to be rotated 90°, as well as being placed in an inclined state so as to come into contact with the ground, all of which allows the snowmobile to be unloaded from the side of the trailer. If such side unloading of the snowmobile could be provided, it would not only bypass the lifting of the snowmobile but also not substantially impede the flow of traffic on the road.

Accordingly, it is an object of the present invention to provide a trailer having a rotatable trailer bed to allow power driven equipment to be driven onto or driven off from either side, or from the rear, of the trailer.

It is a further object of the present invention to provide for universal joint means that accommodates for the side loading/unloading by allowing for pivotal movement of the trailer bed in both the horizontal and vertical planes.

Still another object of the present invention is to provide a locking device for securing the trailer bed so that the power driven equipment may be safely hauled.

Yet another object of the present invention is to provide for a universal joint means that is located on a plane lower than the trailer bed so that the overall center of gravity of the trailer bed is kept low, thereby, contributing to the operational stability of the trailer as it is being moved at driving speeds.

Further objects and features of the present invention will become evident hereinafter.

SUMMARY OF THE INVENTION

The present invention is directed to a trailer having a trailer bed for carrying power driven equipment and having means so that the power driven equipment may be driven onto or driven off of the trailer bed from either side thereof, or from the rear.

The trailer of the present invention is removably attachable to a towing vehicle and comprises a drawbar, a first coupling means, a second coupling means, a universal joint means, at least one rotatable wheel assembly, and a trailer bed. The drawbar has first and second ends that are separated by an intermediate section thereof. The first coupling means is situated at the first end of the drawbar for removably attaching the drawbar to the towing vehicle. The second coupling means is situated at the intermediate section of the drawbar. The universal joint means is situated at the second end of the drawbar and comprises tilting and pivoting means that respectively allow vertical tilting and lateral rotational motion. The at least one rotatable wheel assembly is interconnected to a first carrier frame having first and second ends. The trailer bed is positioned above both the drawbar and the at least one rotatable wheel. The trailer bed has a center support member having first and second sections that are separated by an intermediate section. The first section of the center support member has fastening means for releasably connecting to the second coupling means. The intermediate section of the center support member has first and second portions respectively connected to the first and second ends of the first carrier frame.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

FIG. 1 is a side view of the trailer system of the present invention carrying a snowmobile and attached to a towing vehicle.

FIG. 2 is a side view of the trailer of the present invention showing the rear unloading capability made available by the trailer system of the present invention while still being attached to a towing vehicle.

FIG. 4 is a top view of the trailer system of the present invention partially broken away so as to illustrate the structural details of the trailer bed.

DETAILED DESCRIPTION OF THE PREFERRED EMBODIMENTS

Figure 3:
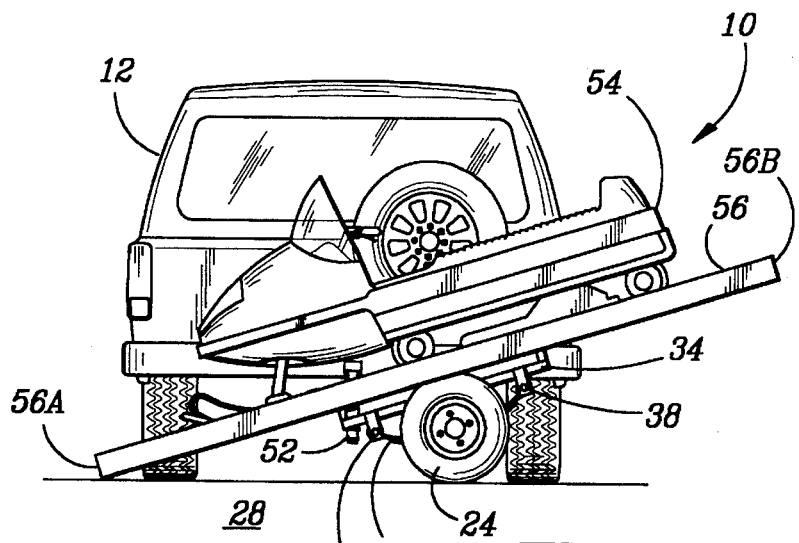
FIG. 3 is a side view of the trailer system of the present invention showing the side unloading capability made available by the trailer system of the present invention while still being attached to a towing vehicle.

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Referring now to the drawings in detail, where like numerals refer to like parts or elements, there is shown in FIG. 1 a trailer system 10 for hauling, loading, and unloading power driven equipment, such as snowmobiles or lawn tractors. The trailer system 10 not only carries or hauls the power driven equipment, but also allows the power driven equipment to be driven onto or driven off therefrom from either side thereof. Further, the power driven equipment may be loaded from the side and loaded off from the rear of the trailer system 10, being hauled by vehicle 12, when the trailer system 10 is arranged in a manner as to be described with reference to FIG. 2. The vehicle 12 hauls or tows the trailer 10 primarily by the interconnection of a drawbar 14 thereto, which is of prime importance to the present invention.

The drawbar 14 has a first end 16 with an inclined portion 17 and a second end 18, both ends being separated by an intermediate section 20. The drawbar 14 serves as the beam to which other elements of the trailer system 10 are hitched and provides the structural means for the other elements of the trailer system 10 to be vertically tilted and laterally moved in a manner as to be described.

The trailer system 10 further comprises a wheel assembly 22 which may be described with simultaneous reference to FIGS. 1 and 4. The wheel assembly comprises at least one rotatable wheel 24 but preferably has a second wheel 26, both of which rest on the ground 28. The wheel 24 cooperates with an elliptical or leaf spring 30, whereas the wheel 26 cooperates with a similar elliptical or leaf spring 32. The spring 30 is connected to a first carrier frame 34 by means of clamping devices 36 and 38. The second spring 32 is connected to a second carrier frame 40 by means of clamping devices 42 and 44. Carrier frames 34, 40 are attached to the trailer bed, at lateral supports 74, 80 by means of brackets 90, 92, 94 and 96, as described more fully below. The wheels 24 and 26 are interconnected by an axle 46 in a conventional manner. Each carrier frame 34, 40 is rigid and acts to connect the wheel assembly 22 to the trailer bed 56. The wheel assembly 22 is connected to the trailer bed 56 by attaching each leaf spring 30 and 32 to the axle 46 so as to suspend the trailer bed 56 above the wheels 24 and 26 and allow the axle 46 to rotate. The ends of each leaf spring 30, 32 are attached to the carrier frames 34, 40 by the clamping devices 36, 38, 40 and 42. The opposite ends of the carrier frame 34, 40 are then attached to the lateral support members 74, 80 of the trailer bed 56 by bracket means 90–96 as also described more fully below. The forward movement on the wheels 24 and 26 is controlled by the towing vehicle 12 of FIG. 1.

The towing vehicle 12 is coupled to the trailer system 10 by means of a conventional trailer hitch or first coupling means 48 situated at and attached to the first end 16 of the drawbar 14. The drawbar 14 also carries a second coupling means 50 situated at and attached to the intermediate section 20, and a universal joint means 52 situated at and attached to the second end 18. The second coupling means 50 and the universal joint 52 form the tilt rotation means for the trailer system 10 which is the primary means so that a trailer bed 56 upon which the power driven equipment 54, such as the snowmobile shown in FIG. 1, rest can be conveniently tilted and swiveled to allow for convenient loading and unloading from either side (or the rear) of the trailer system 10.

The trailer bed 56, most clearly shown in FIG. 4, has a front section with corners both indicated as 56A, and the rear section having corners both indicated as 56B. The trailer bed 56 further comprises a floor 58 which is partially illustrated so as to more clearly show the structural members comprising the trailer bed 56. The trailer floor may be constructed of a durable, hard surface, such as plastic, corrosion resistant metal alloy, or wood (sheet or planking) which will support the snowmobile or other powered device. The trailer bed 56 has a center support member 60 having first and second sections 60A and 60B, respectively, that are separated by an intermediate section 60C. The center support member 60 runs the full length of the trailer bed 56.

The trailer bed 56 further comprises side and end support members 62, 64, 66 and 68, wherein side support members 62 and 66 each have raised ledges 62A and 66A, respectively, that serve as a means for confining the lateral movement of the snowmobile 54, whereas the end support members 64 and 68, do not have such raised ledges, thereby, allowing easy ingress and egress of the snowmobile 54 on and off the trailer bed 56. The end support member 64 serves as a rear portion of the trailer bed 56, and the end support member 68 serves as a front portion of the trailer bed.

The trailer bed 56 further comprises a plurality of lateral support members 70, 72, 74, 76, 78 and 80 arranged as shown in FIG. 4. The trailer bed 56 still further comprises longitudinal support members 82 and 84, each of which is connected between lateral support member 80 and the front end support member 68. An arcuate support member 86, having a center point 88, is connected to opposite ends of support member 80 and overlying the front portion 60A of center support member 60. The support member 80 is also connected to the first and second carrier frames 34 and 40 by means of brackets 90 and 92, shown in phantom. Similarly, the support member 74 is connected to the first and second carrier frames 34 and 40 by means of brackets 94 and 96, also shown in phantom.

As will be further discussed hereinafter, the trailer bed 56, in cooperation with the second coupling means 50 and the universal joint 52, may be easily pivoted to provide for convenient side loading and unloading positions merely by pushing or pulling any of the corners 56A or 56B so that the trailer bed 56 moves, with respect to the pivot point 52A of the universal joint 52, in a clockwise direction indicated by arrows 98A and 98B, or a counterclockwise direction indicated by arrows 100A and 100B. Further, pushing or pulling any of the corners 56A or 56B causes the movement of both wheels 24, 26 (i.e. the wheel assembly 22) in a clockwise direction indicated by arrow 98C, or in a counterclockwise direction indicated by arrow 100C.

Figure 6:
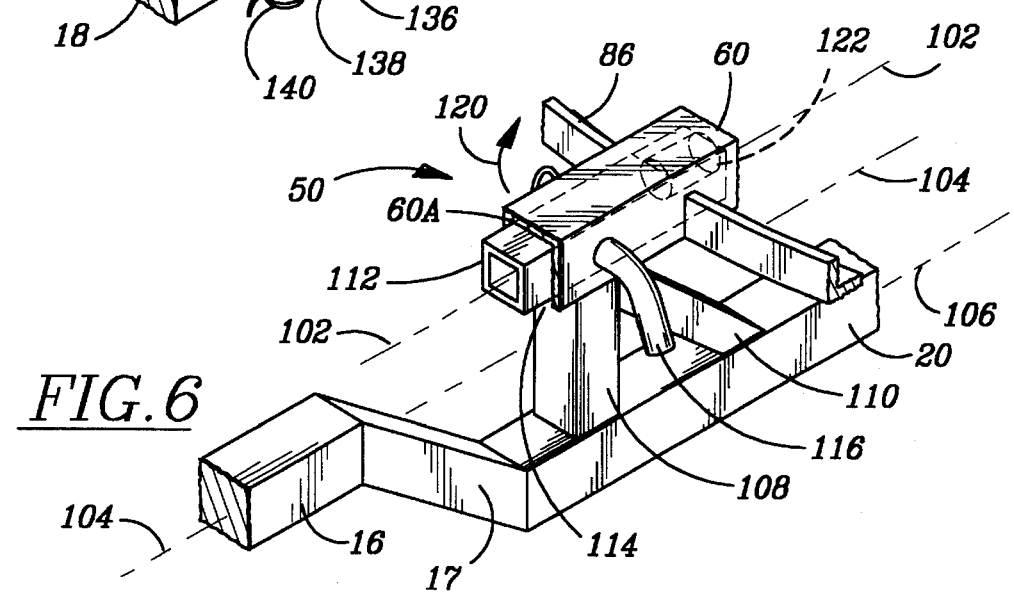
FIG. 6 is an enlarged view of the forward located locking mechanism serving as a second coupling device of the trailer system of the present invention.

The second coupling means 50 may be further described with reference to FIG. 6. As shown in FIG. 3, the center support member 60 lies in a horizontal plane 102, the first end 16 of the drawbar 14 lies in a horizontal plane 104, and the intermediate section 20 of the drawbar 14 has a horizontal plane 106. Further, as shown in FIG. 6, the height or elevation of planes 104 and 106 are separated by the inclined portion 17 of the first end 16. The overall effect of the off-set elevations (104 and 106) is to interconnect the second coupling 50, as well as the universal joint 52, to the trailer bed 56 while still maintaining the center of gravity of the trailer bed at a relatively low elevation, thereby maintaining or even improving the stability of the trailer system 10, especially when being moved at relatively high speeds.

The second coupling means 50 comprises an upstanding support member 108 that extends upward from the upper surface of the intermediate section 20 and is braced thereto by a cross member 110. The upright member 108 provides support for both the first end 60A of the center support member 60 having a downward opening slot 114 that fits over a horizontal support member 112. The support member 112 and the central support member 60, in particular the first end 60A, each has an opening (not shown) that are in correspondence with each other and each has a diameter so that a fastening means 116, having a retention means 118 (not fully shown) may be inserted therethrough, thereby causing the upright member 108, center support member 60, and the support member 112 to be releasably connected to each other. When the pin 116 is removed, the center member 60A may be moved upward, thereby, allowing the trailer bed 56 to be raised or tilted in an upward direction, indicated by arrow 120. The tilting of the trailer bed 56 cooperates with the tilting and pivoting capabilities provided by the universal joint 52 (to be described) so that the trailer bed 56 may be selectively moved to provide for side loading/unloading of the load 54. During such movement of the trailer bed 56, the arcuate support member 86 may be rotationally moved along its arcuate length by means of a roller 122. The roller 122 is constantly biased by a spring (not shown) so that once the center support member 60 is raised, the roller 122 exits partially outward from the upper face of the support member 112 so that the roller 122 may find its way into contact with the arcuate support member 86 and assist or ease the movement of the movement of the trailer bed 56. The movement of the trailer bed 56 is primarily determined by the operation of the universal joint 52 which may be further described with reference to FIG. 5.

Figure 5:
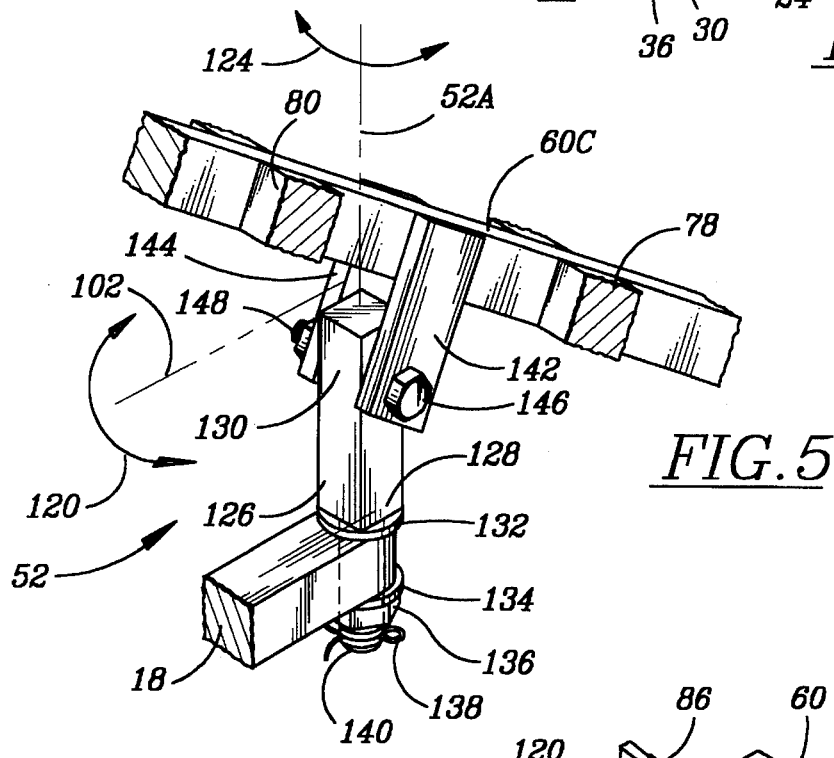
FIG. 5 is an enlarged view of the centrally located universal joint of the trailer system of the present invention.

FIG. 5 illustrates the universal joint means 52 as not only having the ability to tilt, indicated by arrow 120, relative to the horizontal plane 102, but also the ability to pivot about the pivot point 52A of the universal joint means 52, as indicated by rotational arrow 124. The rotational arrow 124 indicates that the center support member 60 and the remaining members of the trailer bed 56 connected to the center support member 60 pivot, in a lateral manner, about the pivot point 52A of the universal joint means 52.

The universal joint 52 comprises a pedestal 126 having a bottom region 128 and a top region 130. The bottom region 128 rests upon a first plate 132 which, in turn, rests upon an upper surface of the second end 18 of the drawbar 14. A second plate 34 is positioned opposite to the first plate 132 and in contact with a lower surface of the second end 18 of the drawbar 14. In one embodiment, the second plate 134 is rotatably fixed in position by means of a nut 136 and a cotter pin 138, both of which engage a threaded screw 140 extending downward from the pedestal 126. The nut 136 is adjusted so that the pedestal 126 may be rotated about the pivot point 52A as indicated by arrow 124. In another embodiment, the first and second plates 132 and 134, respectively, are self contained and interconnected to each other and do not need the assistance of the nut 136, the cotter pin 138 or the threaded screw 140. However, the pedestal remains connected to the threaded screw 140 which still carries the nut 136.

The universal joint 52 further comprises brackets 142 and 144 positioned on opposite faces of the pedestal 126 and have first ends that are respectively connected to opposite faces of the center support member 60 at the intermediate section 60C thereof. The second end of each of the brackets 142 and 144 has an opening that is in coincidence with an opening that extends through the upper region 130 of the pedestal 126. The openings in the brackets 142 and 144 and in the upper region 130 have a preselected diameter so that a bolt 146, with a corresponding diameter may be inserted through each opening and thereby allowing for a nut 148 to threadedly and fixedly engage the distal end of the bolt 146, as shown in FIG. 5.

In operation, the nut and bolt arrangement 146 and 148 is adjusted so that the center support member 60 may be tilted in the directions of arrow 120 relative to the horizontal plane 102 and, similarly, threaded screw 140 and nut 136 are adjusted so that the pedestal 126 may rotate on the plate 132 allowing the pedestal 126 to rotate about the pivot point 52A in a lateral manner as shown by arrow 124. The overall operation of conveniently positioning the trailer bed 56 to provide for side loading/unloading of the snowmobile 54 may be further described with reference to FIG. 2.

As shown in FIG. 2, the pin 116, serving as a releasable fastening means, has been removed from the second coupling means 50 so that the trailer bed 56, and more particularly the end 56A, is free of the second coupling means 50 and is tilted upward therefrom, so that the rear end 56B is touching the ground 28 due to the weight and seesaw effect of the snowmobile 54. If desired, when the trailer bed 56 is in its position shown in FIG. 2 serving as an inclined plane, the snowmobile 54 may be easily guided onto the trailer bed 56 from the ground 28.

Moreover, when the trailer bed 56 is raised just slightly from the position shown in FIG. 1, the operator need only apply a force against one of the corners, such as the front corner 56A (see FIG. 4) of the trailer bed 56, and cause a counterclockwise movement, relative to the pivot axis 52A, as indicated by arrow 100A, thereby moving the trailer bed 56 in a counterclockwise direction and preferably allowing the roller 122 (see FIG. 6) to roll under and provide support for the arcuate support 86 (see FIG. 4). The counterclockwise movement of the trailer bed 56 causes the counterclockwise movement of the wheels 24 and 26, as indicated by arrow 100. Such a continued movement transitions the trailer bed 56 from its position indicated in FIG. 1 to its position indicated in FIG. 3.

As shown in FIG. 3, the snowmobile 54 is positioned on an inclined plane and facing toward the left side of vehicle 12 so that it may be easily driven forward and downward onto the ground 28 and, accordingly, removed from the trailer system 10.

Referring again to FIGS. 2, 4 and 5, it should be recognized that the front corner 56A may be grasped and pushed so that the trailer bed 56 moves in a clockwise direction, as indicated by arrow 98A of FIG. 4, causing the wheels 24 and 26 to be moved in a clockwise direction, as indicated by arrow 98C. Such continued movement causes the trailer bed 56, originally having the position indicated in FIGS. 1 and 4, to obtain a position opposite from that shown in FIG. 3, with the front of the snowmobile facing toward the right side of vehicle 12, thereby, allowing the snowmobile to be driven forward and down the inclined plane provided by the trailer bed 56.

It should be recognized that even though the snowmobile is normally driven onto the trailer system 10 when the front section 56A of the trailer bed 56 is facing the rear of the vehicle 12 as in FIG. 2, such loading may be accomplished with the trailer bed 56 arranged transverse to the vehicle 12 as generally illustrated in FIG. 3 with the rear 56B touching the ground 28 so that the power drive equipment may be driven onto the bed 56 and the bed may then be lifted and rotated to the position shown in FIGS. 1 and 4.

It should now be appreciated that the practice of the present invention provides for the trailer bed 56 to be conveniently positioned allowing the power driven equipment to be driven onto and off the trailer bed 56 from either the rear, left side or right side of the trailer bed.

It should be further appreciated that the practice of the present invention provides for a locking mechanism, served by the locking key 116, so that the trailer bed 56 is securely attached to the drawbar 14 for retaining the trailer bed 56 in a fixed position and allowing the snowmobile to be securely moved along a highway.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

I claim:

1. A trailer removably attachable to a towing vehicle comprising:
    a. a drawbar having first and second ends that are separated by an intermediate section;
    b. a first coupling means, situated at said first end, for being removably attached to the towing vehicle;
    c. a tilt-rotation means having a second coupling means situated at said intermediate section and
    a universal joint means situated at said second end of the drawbar which operates in conjunction with said second coupling means for respectively allowing vertical tilting and lateral rotation of said trailer;
    d. a trailer bed upon which power driven equipment rests positioned above said drawbar, said trailer bed comprising a flooring means and a rigid center support member running along the underside of said flooring means and having a first end section and a second end section that are separated by an intermediate section, said first end section having fastening means attached thereto for releasably connecting to said second coupling means, said intermediate section of said center support member having first and second portions respectively connected to first and second ends of a carrier frame;
    e. at least one rotatable wheel assembly positioned below said trailer bed interconnected to said trailer bed by said first and second ends of said carrier frame by bracket means.

2. The trailer apparatus according to claim 1, wherein said first end section of said center support member and said second coupling means each have an opening in correspondence with each other and wherein said fastening means comprises a grippable pin insertable into both openings of said center support member and said second coupling means.

3. The trailer apparatus according to claim 1, wherein said trailer bed comprises an arcuate support member having a center point positioned above and coinciding with the second coupling means.

4. The trailer apparatus according to claim 3, wherein said second coupling means further comprises a roller means extending upward from said second coupling means for contacting and supporting said arcuate support member for enabling the lateral rotational motion of said trailer bed.

5. The trailer apparatus according to claim 1, wherein said universal joint means comprises:
    a. a rotatable pedestal having a top region with an opening therein and a bottom region coupled to first and second interconnected plates that are spaced apart from each other and located on opposing surfaces of said second end of said drawbar;
    b. first and second brackets each having first and second ends with the first ends thereof located on opposing surfaces of said first portion of said intermediate section of said center support member, said second ends of said brackets each having an opening complementary with said opening of said top region of said pedestal; and
    c. a retaining bolt inserted into each of said openings of said pedestal and said first and second brackets for allowing said first and second brackets to tilt with respect to said pedestal.

6. The trailer apparatus according to claim 1, wherein said first end and said intermediate section of said drawbar are separated by at least an inclined portion so that said intermediate section is at a lower vertical plane than that of said first end.

\* \* \* \* \*